US012642244B2

(12) United States Patent　　(10) Patent No.:　US 12,642,244 B2
Eriksson et al.　　(45) Date of Patent:　Jun. 2, 2026

(54) AUTOMATIC SELECTION OF ANIMALS TO BE TREATED DURING A TREATMENT PERIOD

(71) Applicant: DELAVAL HOLDING AB, Tumba (SE)

(72) Inventors: Göran Eriksson, Tumba (SE); Anders Umegård, Tumba (SE)

(73) Assignee: DeLaval Holding AB, Tumba (SE)

( * ) Notice: Subject to any disclaimer, the term of this patent is extended or adjusted under 35 U.S.C. 154(b) by 55 days.

(21) Appl. No.: 18/563,786

(22) PCT Filed: May 18, 2022

(86) PCT No.: PCT/SE2022/050487
§ 371 (c)(1),
(2) Date: Nov. 22, 2023

(87) PCT Pub. No.: WO2022/250594
PCT Pub. Date: Dec. 1, 2022

(65) Prior Publication Data
US 2024/0245031 A1　　Jul. 25, 2024

(30) Foreign Application Priority Data

May 26, 2021　(SE) .................................... 2150665-4

(51) Int. Cl.
*A01K 1/00*　　(2006.01)
*A01K 1/12*　　(2006.01)
*A01K 29/00*　　(2006.01)
(52) U.S. Cl.
CPC .............. *A01K 1/0023* (2013.01); *A01K 1/12* (2013.01); *A01K 29/005* (2013.01)
(58) Field of Classification Search
CPC ....... A01K 1/0023; A01K 1/12; A01K 1/0029
See application file for complete search history.

(56) References Cited

U.S. PATENT DOCUMENTS

| 6,062,164 | A | 5/2000 | Oosterling |
| 10,912,283 | B2 * | 2/2021 | Vrabete .................. G16H 40/63 |

(Continued)

FOREIGN PATENT DOCUMENTS

| WO | 03086058 A1 | 10/2003 | |
| WO | WO-2012005673 A1 * | 1/2012 | ................ A01J 5/00 |
| WO | 2019226106 A1 | 11/2019 | |

OTHER PUBLICATIONS

Written Opinion of the ISA for PCT /SE2022/050487 mailed Sep. 14, 2022, 8 pages.

(Continued)

*Primary Examiner* — Joshua D Huson
*Assistant Examiner* — Alanna K Peterson
(74) *Attorney, Agent, or Firm* — NIXON & VANDERHYE

(57) ABSTRACT

The disclosure relates to a sorting system for automatically selecting animals to be treated during a treatment period. A first aspect is a sorting system automatically selecting animals to be treated during a treatment period. The sorting system includes an automatic sort gate and a control arrangement receiving, via a user interface, user input indicative of sorting criteria applicable to animal properties and a maximum number of the animals allowed to be present simultaneously in the sorting area. The control arrangement is further configured to monitor a number of animals that enter and exit the sorting area. The control arrangement is finally configured to adjust one or more parameter values of the one or more sorting criteria, based on the monitored number of animals that enter and exit the sorting area. The disclosure also relates to a corresponding method and to a computer program for performing the method.

31 Claims, 3 Drawing Sheets

(56)         References Cited

U.S. PATENT DOCUMENTS

| 2003/0226522 | A1* | 12/2003 | Thibault | ................ | A01K 29/00 |
| | | | | | 119/842 |
| 2008/0282985 | A1 | 11/2008 | Schulte | | |
| 2010/0116211 | A1 | 5/2010 | Sundborger | | |
| 2010/0180824 | A1 | 7/2010 | Bright et al. | | |
| 2011/0308465 | A1* | 12/2011 | Siddell | .................... | A01K 1/12 |
| | | | | | 119/14.08 |
| 2016/0262337 | A1 | 9/2016 | Lancaster | | |
| 2020/0315133 | A1 | 10/2020 | Schomaker et al. | | |

OTHER PUBLICATIONS

Swedish Search Report for SE2150665-4 mailed Jan. 21, 2022, 2 pages.

International Search Report for PCT /SE2022/050487 mailed Sep. 14, 2022, 2 pages.

\* cited by examiner

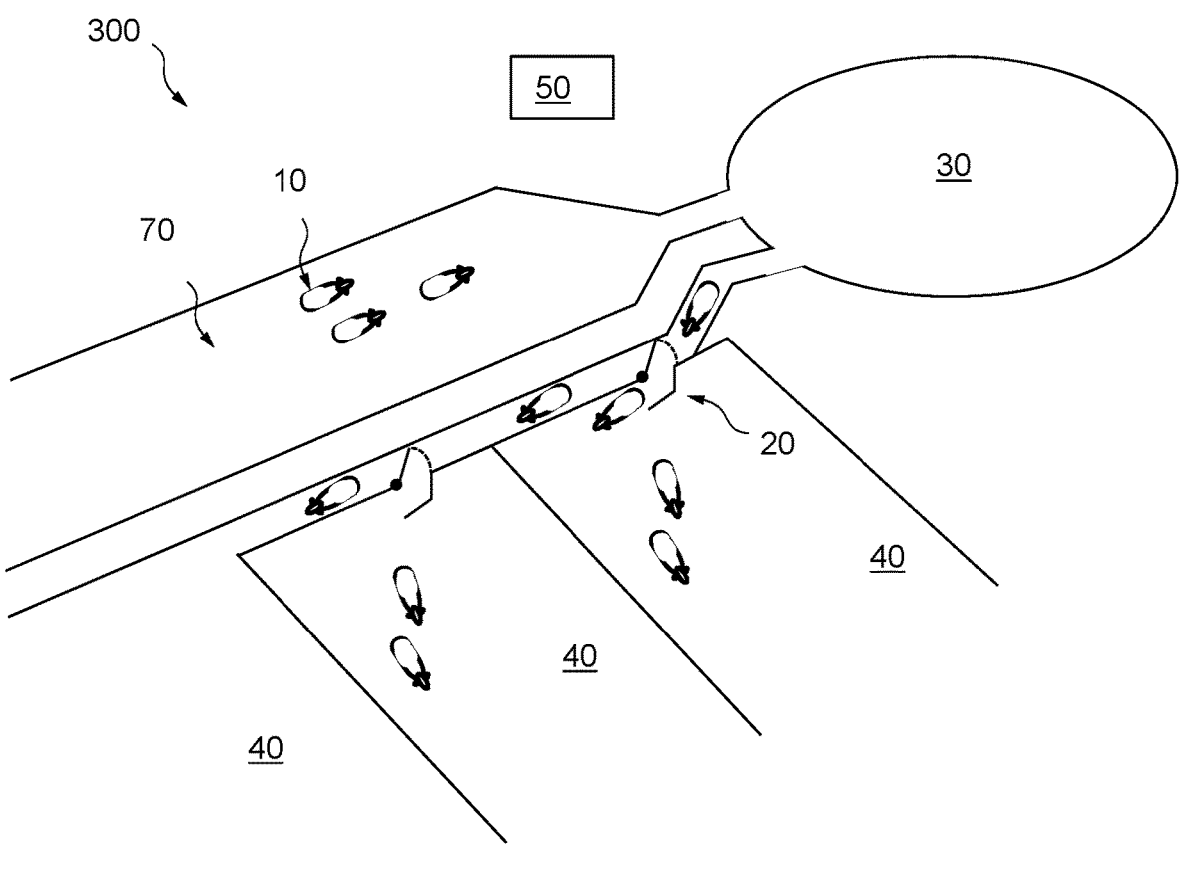
FIG. 1
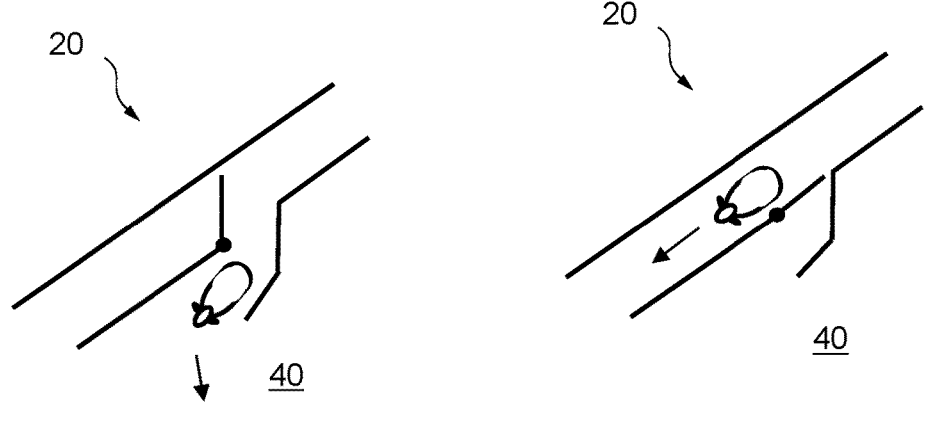
FIG. 2a                                    FIG. 2b

AUTOMATIC SELECTION OF ANIMALS TO BE TREATED DURING A TREATMENT PERIOD

CROSS-REFERENCE TO RELATED APPLICATIONS

This application is the U.S. national phase of International Application No. PCT/SE2022/050487 filed May 18, 2022 which designated the U.S. and claims priority to SE 2150665-4 filed May 26, 2021, the entire contents of each of which are hereby incorporated by reference.

TECHNICAL FIELD

The present disclosure generally relates to dairy farming and in particular to a sorting system for automatically selecting animals to be treated during a treatment period. The disclosure also relates to a corresponding method and to a computer program for performing the method.

BACKGROUND

An automatic sorting system is a tool commonly used on larger dairy farms. In advanced setups, there may be multiple sorting areas, used for different treatment procedures (hoof trimmings, artificial inseminations, vaccinations, health checks etc.). The sorting system typically works in one of two ways. Either the sorting system is programmed to sort specific animals to specific locations at a stipulated time frame or the sorting system is configured to sort animals based on specific conditions/animal properties (possibly in combination with time or date) using sorting criteria.

A drawback of existing solutions is that the number of animals sorted into a specific sorting area may vary significantly over time, especially when using the latter option, as animals fulfilling the sorting criteria may be too many/few or will in many situations not arrive to the sorting system in a steady stream. The consequence is either that there are too many selected animals (will not fit) in the sorting area or that there are no/too few selected animals in the sorting area during extended periods of a scheduled treatment period. An overcrowded sorting area is particularly problematic as there is not enough time to treat all of the animals and there is a risk of missing out on animals that should have been given highest priority. The overcrowded sorting area also creates a rather stressful environment for both animals and staff, which in combination with an inconsistent flow of animals is especially problematic when planning or optimizing the work performed by the staff in the sorting area. For example, the existing solutions are insufficient when planning a hoof trimming session or when trying to achieve an optimal number or flow of animals for other treatments in a limited sorting area.

All in all, these problems or limitations both hinders existing sorting systems to work optimally and also discourage farmers from using their automatic sorting system extensively. Not the least, it discourages farmers from seeing a benefit in at all using the automatic sorting system.

SUMMARY

It is an object of the disclosure to alleviate at least some of the drawbacks of the existing sorting systems. Thus, it is an object to provide a sorting system implementing a smarter automatic sorting method that mitigate risks that a sorting area becomes overcrowded. It is a further object to provide an automatic sorting enabling a more effective treatment or optimization of the work performed in the sorting area.

According to a first aspect, the disclosure relates to a sorting system for automatically selecting animals to be treated during a treatment period. The sorting system comprises an automatic sort gate and a control arrangement. The automatic sort gate is arranged to selectively sort animals arriving from a milking area into a sorting area for performing a treatment. The control arrangement is configured to receive, via a user interface, user input indicative of one or more sorting criteria applicable to one or more animal properties to determine whether an animal should be allowed to enter the sorting area to receive the treatment. The control arrangement is further configured to receive user input on a maximum number of the animals allowed to be present simultaneously in the sorting area during the treatment period. The control arrangement is further configured to monitor, continually during the treatment period, a number of animals that enter and exit the sorting area. The control arrangement is finally configured to adjust one or more parameter values of the one or more sorting criteria, based on the monitored number of animals that enter and exit the sorting area and the received maximum number of animals, and to control the automatic sort gate using the sorting criteria comprising the adjusted one or more parameter values.

In this way, the proposed sorting system enables a dynamic adjustment of the parameter values of the sorting criteria based on the monitored number of animals and/or a flow of animals in the sorting area. The farmer or user provides the relevant inputs (at start-up of the sorting system) on desired sorting criteria, the maximum number of animals allowed to be present simultaneously in the sorting area(s) and a desired treatment period (morning/evening milking session), whereby the parameter values of the sorting criteria are adjusted automatically as the monitored number and/or flow of selected animals in and/or through the sorting area increases/decreases. Thereby, the risk that the sorting area becomes overcrowded is mitigated and a more efficient treatment procedure or optimal workload for the staff in the sorting area is achieved by the sorting system. Also, the risk of missing treatment of higher priority animals, unnecessary stress and "unproductive" time of lower priority animals in the sorting area can be avoided.

The one or more animal properties may comprise registered animal properties and/or monitored animal properties. The sorting criteria can hereby be tailored based on the situation and both registered animal properties (conditions) fetched from a herd management data base (e.g. historical data, age, dates of last hoof trim, vaccination, insemination, last calving or registered sorting flags/assigned priorities) and monitored animal properties (conditions) being measured (e.g. temperature, milking data or behavior data from different sensors configured to detect various conditions, such as infections, sickness, lameness or heat) can be used in the sorting criteria.

In some embodiments, the one or more adjusted parameter values comprises at least one threshold value and the control arrangement is configured to compare the one or more animal properties (conditions) to the at least one threshold value to determine whether a certain animal should be selected to enter the sorting area for treatment. In this way it is possible to make the sorting criteria more or less strict by adjusting threshold value(s) depending on the situation in the sorting area. Hence, threshold value(s) can hereby be adjusted upwards/downwards as the monitored number of animals in the sorting area(s) increases/decreases and/or the flow of animals though the sorting area(s) decreases/increases.

Hence, in an embodiment, the control arrangement is configured to, based on the continually monitored number of animals that enter and exit the sorting area, continually determine a number of animals present in the sorting area and to adjust the parameter (threshold) values based on the determined number of animals present in the sorting area. In this way the number of lower to higher priority animals present in the sorting area, in relation to the allowed maximum number, is controlled by adjustment of the parameter (threshold) values.

Additionally, in a further embodiment, the control arrangement is configured to, based on the continually monitored number of animals that enter and exit the sorting area, calculate a flow parameter, which reflect the number of animals that pass through the sorting area per time unit, and to adjust the parameter (threshold) values based on the calculated flow parameter. In this way a consistent flow of animals can be achieved as the inflow to the sorting area may be adjusted to match the outflow from the sorting area. This embodiment can also be combined with the previous embodiment to provide a control arrangement configured to adjust the parameter (threshold) values based on both the determined number of animals present in the sorting area and the calculated flow parameter (throughput) in the sorting area.

In the above mentioned embodiments, the control arrangement is preferably configured to adjust the parameter value by setting a higher threshold value upon calculating a first flow parameter value than upon calculating a second flow parameter value, wherein the first flow parameter value is lower than the second flow parameter value. Thereby, the inflow to the sorting area decreases if the flow (throughput) through the sorting area decreases, and vice versa.

In some embodiments, the control arrangement is configured to adjust the parameter value by setting a higher threshold value upon determining a first number of animals in the sorting area than upon determining a second number of animals in the sorting area, wherein the first number of animals in the sorting area is higher than the second number of animals in the sorting area. Thereby, the inflow of animals to the sorting area decreases if the number of animals in the sorting area increases, and vice versa.

In a further embodiment, the control arrangement is configured to assign individual priorities to the animals and wherein the one or more sorting criteria is applicable to the assigned individual priorities. Thereby a user, such as a farmer or staff, can select or manually flag individuals that should receive the treatment for any reason independent on the animal properties (conditions), by assigning a high priority to those individuals.

In some embodiments, the one or more parameter values define a maximum number of animals having a priority lower than a certain threshold value that are allowed to enter or reside in the sorting area at the same time or during a certain period of time. Thereby, it can be assured that the sorting area always has room for a certain number of high priority animals and that the sorting area is never filled up by a relatively high number of low priority animals, which could otherwise disturb/sub-optimize the work performed in the sorting area during the treatment period.

In some embodiments, the control arrangement is configured to retrieve position data defining individual positions of the animals from a Real Time Location System, RTLS, and adjust the one or more parameter values based on the position data. Thereby, position data for use in the sorting criteria is obtained in an efficient way. In this way, the adjustment of the parameter value(s) on the basis of the RTLS position data enables the automatic sorting system to plan for incoming animals of higher priority, while the animals are present in for instance a milking or waiting area to ensure that these animals are prioritized for the sorting and treatment. Such position data from the RTLS also enables an estimation/prediction of a time of arrival and/or how many high priority animals that will pass by the sort gate during a time period. The position data from the RTLS is also beneficially used in the monitoring of animals in the sorting area to determine when animals exit/enter the sorting area, so that the parameter value(s) are also adjusted in response to the in- and outflow of animals in the sorting area.

Hence, in the above mentioned embodiment, the control arrangement is preferably configured to monitor a number of animals that enter and exit the sorting area based on the position data. Thereby, the number of animals that enter and exit the sorting area can be continually monitored, without dedicated hardware (e.g. RFID readers at entrance and exit of sorting area), by using only the RTLS that may already be installed for monitoring the positions of the animals in the dairy farm.

In some embodiments, the control arrangement is configured to adjust the one or more parameter values based on the positions of prioritized animals that have been assigned a priority above a certain threshold value. Thereby, the parameter values of the sorting criteria can be adjusted such that it is assured that prioritized animals are always treated, while at the same time assuring that the sorting area is never empty.

In some embodiments, the control arrangement is configured to estimate, based on the position data, arrival times of the prioritized animals at the sort gate, and to adjust the one or more parameter values based on the estimated arrival times at the sort gate of the prioritized animals. Thereby, it may be assured that the sorting area is not full when the prioritized animals arrive.

In some embodiments, the control arrangement is configured to provide, via for instance a loudspeaker or a user interface, an instruction to a user to perform an action upon detecting a potential sorting conflict. Thereby, the user (the staff or farmer) is warned when the sorting system cannot perform a sorting operation. Such exceptional situations may for instance arise when the sorting area is full, while an animal being milked is flagged as high priority for serious health reasons. The embodiment thereby enables the user (staff) to be warned (by for instance a loudspeaker in the sorting area) about the conflict and is further provided with the option of performing a suitable action, such as allowing a sorting of the incoming animal although the sorting area is full, releasing another animal present in the sorting area to allow the incoming animal entry, ignoring the animal or holding the animal for a later sorting action.

In some embodiments, the sorting conflict may simply indicate that the number of animals in the sorting area is expected to reach the maximum number of animals in the sorting area. If the staff/farmer is warned about such a scenario in advance, it is possible to take measures such as letting out some animals from the sorting area without receiving the treatment.

However, the sorting conflict preferably comprises the situation that animals with a priority above a threshold value are expected to arrive at the sort gate within a certain time period. Thereby, the staff/farmer can be warned if it turns out impossible to sort/treat all of the prioritized animals.

In some embodiments, the sorting conflict comprises that the calculated flow parameter indicates that an average flow of animals through the sorting area has decreased more than a certain amount. This may be an indication that the sorting does not work properly, and that some manual intervention or reconfiguration of the sorting system is required.

In some embodiments, the sorting conflict comprises that the determined number of animals in the sorting area exceeds the maximum number of animals.

According to a second aspect, the disclosure relates to a computer implemented method, for operating an automatic sort gate arranged to selectively sort animals arriving from a milking area into a sorting area for performing a treatment of the animals. The computer implemented method comprises receiving, via a user interface, user input indicative of one or more sorting criteria applicable to one or more animal properties to determine whether an animal should be allowed to enter the sorting area to receive the treatment, and a maximum number of the animals allowed to be present simultaneously in the sorting area during a treatment period. The computer implemented method further comprises monitoring automatically a number of animals that enter and exit the sorting area during the treatment period, adjusting, based on the monitoring and the received maximum number of animals, one or more parameter values of the one or more sorting criteria, and controlling the sort gate using the sorting criteria comprising the adjusted one or more parameter values.

As previously mentioned, the animal properties may hereby comprise registered animal properties and monitored animal properties.

In some embodiments, the one or more adjusted parameter values comprises at least one threshold value and wherein the controlling comprises comparing the one or more animal properties to the at least one threshold value to determine whether a certain animal should be allowed to enter the sorting area.

In some embodiments, the computer implemented method comprises determining continually a number of animals present in the sorting area based on the automatic monitoring and/or calculating, based on the automatic monitoring, a flow parameter which reflect the number of animals that pass through the sorting area per time unit, and adjusting the parameter values based on the determined number of animals in the sorting area and/or the calculated flow parameter.

In some embodiments, the adjusting comprises setting a higher threshold value upon calculating a first flow parameter value than upon calculating a second flow parameter value, wherein the first flow parameter value is lower than the second flow parameter value.

In some embodiments, the adjusting comprises setting a higher threshold value upon determining a first number of animals in the sorting area than upon determining a second number of animals in the sorting area, wherein the first number of animals in the sorting area is higher than the second number of animals in the sorting area.

In some embodiments, the computer implemented method comprises assigning individual priorities to the animals. In these embodiments, the one or more sorting criteria is applicable to the assigned individual priorities.

In some embodiments, the one or more parameter values define a maximum number of animals having a priority lower than a certain threshold value that are allowed to enter or reside in the sorting area at the same time or during a certain period of time.

In some embodiments, the computer implemented method comprises retrieving position data defining individual positions of the animals from a Real Time Location System, RTLS, and adjusting the one or more parameter values based on the position data.

In some embodiments, the monitoring is performed based on the position data.

In some embodiments, the computer implemented method comprises adjusting the one or more parameter values based on positions of prioritized animals that have been assigned a priority above a certain threshold value.

In some embodiments, the computer implemented method comprises estimating, based on the position data, arrival times of the prioritized animals at the sort gate, and adjusting the one or more parameter values based on the estimated arrival times at the sort gate of the prioritized animals.

In some embodiments, the computer implemented method comprises, providing, via for instance a loudspeaker or a user interface, an instruction to a user to perform an action, upon detecting a potential sorting conflict.

In some embodiments, the sorting conflict comprises that the number of animals in the sorting area is expected to reach the maximum number of animals in the sorting area.

In some embodiments, the sorting conflict comprises that animals with a priority above a threshold value are expected to arrive at the sort gate within a certain time period.

In some embodiments, the sorting conflict comprises that the calculated flow parameter indicates that an average flow of animals through the sorting area has decreased more than a certain amount.

In some embodiments, the sorting conflict comprises that the determined number of animals in the sorting area exceeds the maximum number of animals.

According to a third aspect, the disclosure relates to a computer program comprising instructions which, when the program is executed by a computer, cause the computer to carry out the method according to the second aspect.

According to a fourth aspect, the disclosure relates to a computer-readable medium comprising instructions which, when executed by a computer, cause the computer to carry out the method according to the second aspect.

BRIEF DESCRIPTION OF THE DRAWINGS

FIG. 1 illustrates a top view of an example livestock area comprising a sorting system according to a first aspect.

FIGS. 2A and 2B schematically illustrates operation of a sort gate.

DETAILED DESCRIPTION

Figure 3:
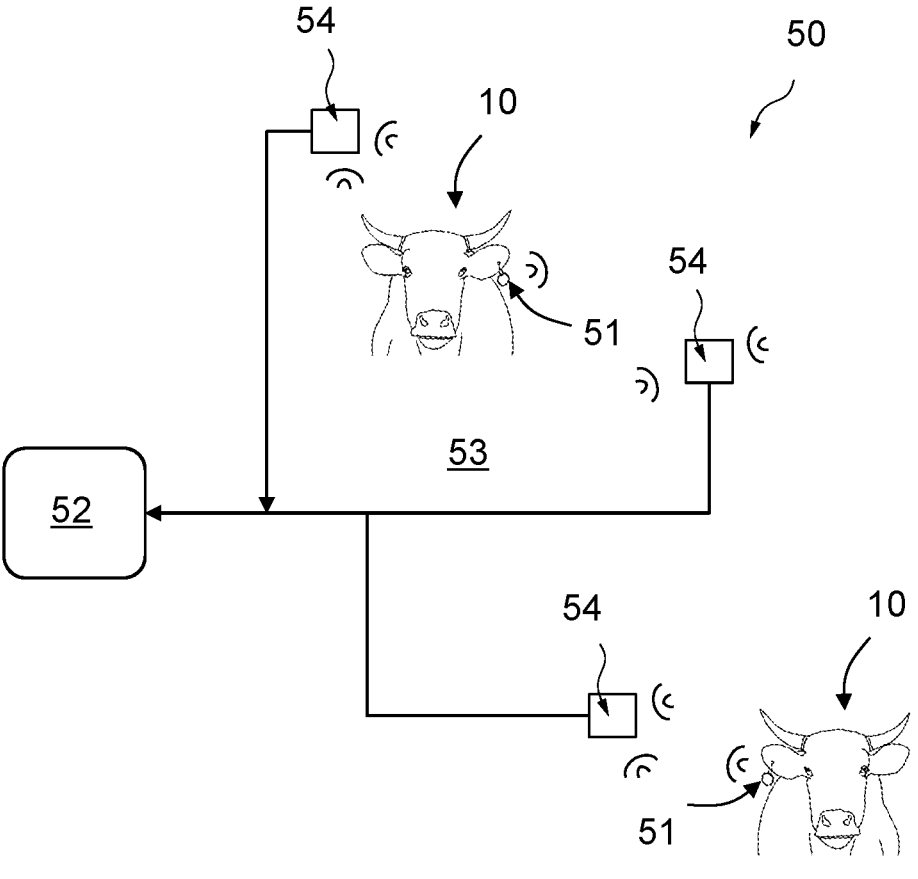
FIG. 3 illustrates a real time location system (RTLS).

Sorting animals, such as cows for inseminations, pregnancy checks, vaccinations, health checks, hoof trimmings and other treatments is typically performed after a milking session. A sort gate is hereby arranged to automatically select cows to be guided into a sorting area to receive a treatment as they leave a milking area. However, cows typically enter, and consequently also exit, the milking area in a more or less random order. In any case, the order in which they enter the milking area is unrelated to the succeeding treatment.

The inventors have realized that one problem of today's automated sorting systems is that they risk sorting out too many/few or an irregular number of cows into a sorting area, which serves as a treatment space, over a treatment period or time of day (for example a milking session). Therefore, there is a risk that the treatment/sorting area is overcrowded and that there is not enough time to treat all of the selected cows during the treatment period (milking session). Cows that should have highest priority therefore risk missing treatment and less prioritized cows occupy unnecessary space in the treatment/sorting area.

In addition, it is difficult to predict the flow of animals to the sorting area, since the automatic sorting systems of today do not limit the number of cows being sorted out. This makes it more difficult to establish consistent working routines in the sorting area due to an inconsistent animal flow (especially at larger farms) for the treatment(s) in the sorting area(s).

For example, if a farmer has selected 20 particular animals to receive a treatment, such as hoof trimming, after milking, there is a risk that they will not arrive at the sort gate periodically. In the worst case, all 20 will arrive at the same time. If there is only one person performing the hoof trimming this will lead to substantial waiting times in the sorting area, which may negatively affect the well-being of the cows. In another worst case scenario, the sorting area becomes overcrowded, whereby no more cows can be allowed to enter, which may also lead to a missing out on both selected and non-selected animals that otherwise would have been given highest priority for receiving the hoof trimming. At the same time, the person performing the hoof trimming may from time to time have to wait for a cow to arrive, which is of course inefficient, in particular if the person performing the hoof trimming is an external professional that is contracted/scheduled for a limited time period (the treatment period). These problems are especially occurring when using the on dynamic sorting (i.e. sorting cows based on conditions), which may lead to a difficult balancing act. More specifically, sorting criteria have to be designed to balance the risk of getting too many cows on some occasions, and too few cows in the regular case.

One example which is problematic with existing sorting systems is continuous hoof trimming. When, for example 20 cows should be hoof trimmed every day, the farmer needs to decide by the day which 20 cows to select and cannot really control if these 20 cows come in one batch or more spread out (which may be preferred). If one cow or more would "miss" the sorting area, they need to be manually selected at a later point in time, which is time consuming.

Another related problem is that cows that are waiting for treatment in the sorting area are "unproductive" (more cost, less gain) and it is a challenge, if even possible, to forecast the throughput of a sorting area, as there is no real way to control the order of the cows entering. Furthermore, it is difficult to have consistent routines with a possible inconsistent flow of animals (especially this would be the case for larger farms).

This disclosure proposes a system and a method for automatic sort gate management. The proposed technique is designed to achieve optimal sorting as well as optimal animal well-being. The proposed sorting system solves the above-mentioned problems by introducing a sorting system that is configured with initial sorting criteria as well as with an input parameter defining a maximum number of cows that are allowed to be inside the sorting/treatment area simultaneously. During operation, the system keeps track of the number of animals entering and leaving the sorting area. In this way, the system can determine the number of animals present in the sorting area and/or calculate an animal flow parameter through the sorting area and adjust parameter value(s) of the sorting criteria(s) to provide an even replenishment to the sorting area during the treatment period.

For instance, the above mentioned problem related to a continuous hoof trimming can be solved by the proposed sorting system by scheduling all of the animals in a herd or group for hoof trimming, whereby the system automatically sorts an appropriate number and/or flow of relatively high prioritized animals daily, until the entire herd or group has been sorted and thus hoof trimmed. The sorting system selects as many animals (say on average 20 or in a range of 16 to 23 animals) as the staff has time for on a daily basis in the hoof trimming area. Additionally, it may happen that the sorting system selects fewer animals on certain days, if there are many animals that must be sorted (unconditionally as soon as possible) for other treatments due to other parallel animal properties or conditions with higher priority (e.g. artificial inseminations or health checks due to serious health markers etc.).

The proposed technique will now be briefly described with reference to the figures. More specifically, the proposed technique relates to a system for automatic sorting of animals that need a certain treatment, such as insemination, hoof trimming or a health check.

FIG. 1 illustrates a top view of an example livestock area 300 comprising animals 10, in the illustrated example cows, where the proposed technique may be implemented. The proposed technique is herein described with reference to cows, but it must be appreciated that it can also be used for other dairy animals. The livestock area illustrated in FIG. 1 comprises a holding area 70, a milking area 30, two automatic sort gates 20 and a plurality of sorting areas 40. The holding area 70 and the milking area 30 are separated e.g. by fences. In addition, in some embodiments a real time location system 50, RTLS, which will be further described in FIG. 3 is arranged in the livestock area 300.

The holding area 70 (sometimes also be referred to as waiting area) is used to hold animals 10 waiting to be milked. The milking area 30, may comprise any type of batch milking system, such as a conventional parlour, a number of milking robots or a rotary milking platform (as illustrated). The sorting areas 40, also called treatment areas, are areas where the selected animals 10 are treated. The automatic sort gates 20 are arranged to selectively sort animals 10 arriving from the milking area 30 into the different sorting areas 40 for performing various treatments.

FIGS. 2A and 2B illustrate operation of an automatic sort gate 20 in more detail. The sort gate 20 is typically arranged in a narrow passage, such that the animal cannot turn around. When an animal 1 arrives at the sort gate it is either guided to a corresponding sorting area or alternatively directed forward towards an exit or to another sort gate. In FIG. 2A the automatic sort gate is open, such that an animal 10 is allowed to enter the corresponding sorting area 40. In FIG. 2B the automatic sort gate 20 is closed, whereby the animal is directed forward to another automatic sort gate 20 or to an exit.

FIG. 3 illustrates an example of an RTLS 50 that may be used by the proposed method and sorting system 200. An RTLS 50 is a known type of system used to track the location of objects, such as animals 10, in real time using tags 51 attached to animals 10 located in a livestock area 300 as the one in FIG. 1.

The RTLS also comprises readers 54 that receive wireless signals from these tags 51 to determine their locations. The wireless communication includes, but is not limited to, a cellular radio, a WiFi radio, a Bluetooth radio, a Bluetooth low energy radio, UltraWideBand radio or any other appropriate radio frequency communication protocol. The particular number and placement of the readers 54 will depend on the size and shape of a tracking zone 53, for example the livestock area 300, being monitored.

In some embodiments the tags 51 also comprise orientation sensors configured to generate data indicative of the orientation of the sensor, such as a three-axis accelerometer assembly or a gyro assembly. The tags 51 may also include other sensors or components, such as object monitoring sensors. The object monitoring sensors may comprise a thermometer, a heart rate monitor, a vibration sensor, a camera, a microphone, or any other appropriate device.

When the RTLS 50 is in use, the location of each tag 51 is tracked in real-time within the tracking zone 53 using multi-alteration techniques known in the art, for example using Time Difference of Arrival and Received Signal Strength Indicator techniques. To this end, data from the readers 54 is supplied to a control system 52 that determines, in real-time basis, the instantaneous position of each tag 51 in the tracking zone 53. The control system 52 may be implemented as a computer-based system that is capable of executing computer programs. An exemplary application of the control system 52 includes a real-time location function, configured to determine a two- or three-dimensional position of the tag 51 within a tracking zone 53. The control system 52 may for example use triangulation of data provided by three or more readers 54 to determine the location of the tags 51.

In some embodiments, the control system 52 is configured to determine a movement of the tags 51, including for example direction of movement and amount of movement or speed. In some embodiments, the control system 52 is configured to determine an orientation of the tag 51. In some embodiments, the control system 52 is configured to discriminate between different activities of an animal 10 wearing the tag 51 based upon the location, movement and orientation of the animal's tag within the tracking zone 53.

Figure 4:
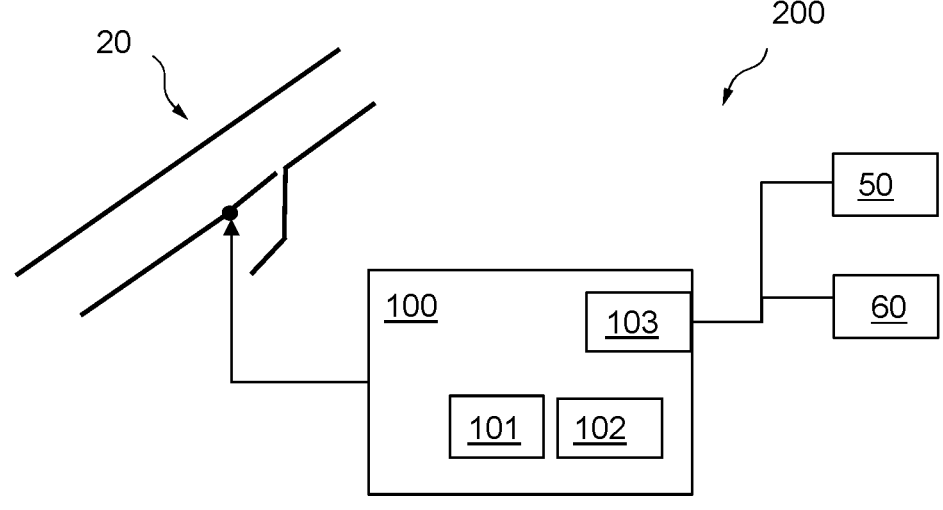
FIG. 4 illustrates a sorting system for automatically selecting animals to be treated during a treatment period according to the first aspect.

The control system 52 may also have one or more communications interfaces. The communications interfaces may include for example, a modem and/or a network interface card. The communications interfaces enable the control system 52 to send and receive data to and from other computing devices such as a control arrangement 100 of the sorting system 200 (FIG. 4). The communications interface also enables the control system 52 to receive messages and data from the readers 54 or from the tags 51 either directly or via another communications network. The communications network may be any network platform and may include multiple network platforms. Exemplary network platforms include, but are not limited to, a WiFi network, a cellular network, etc.

This information, such as real-time positions, provided by an RTLS may be used by the proposed sorting system 200 for operating an automatic sort gate 20.

FIG. 4 is a conceptual illustration of the sorting system 200 for automatically selecting animals 10 to be treated in a sorting area during a treatment period. The illustrated sorting system 200 comprises an automatic sort gate 20 and a control arrangement 100 arranged to selectively sort animals 10 arriving from a milking area 30 into a sorting area 40 for performing a treatment.

The control arrangement 100 comprises hardware and software. The hardware is for example various electronic components on a for example a Printed Circuit Board, PCB. The most important of those components is typically a processor 101 e.g. a microprocessor, along with a memory

102 e.g. EPROM or a Flash memory chip. The software is typically software code that runs in the microprocessor. The illustrated control arrangement 100 also comprises a communication interface 103. The communication interface 103 is configured for communication of signals and/or data between the control arrangement 100 and other systems or devices, such as the RTLS 50 or a user interface 60. The user interface 60 may be any device that a user may use to interact with the control arrangement 100. The user interface 60 may for instance be a personal computer on which the farmer is monitoring the herd via a herd management program. The user interface 60 may also be a so called milking point controller provided at each milking place in the parlour. In some embodiments, a graphical user interface is be presented on a user device such as on a display of a computer, tablet or similar. The user device typically comprises an input device such as a touch screen, keyboard and/or microphone and an output device such as a display and/or a loudspeaker.

Figure 5:
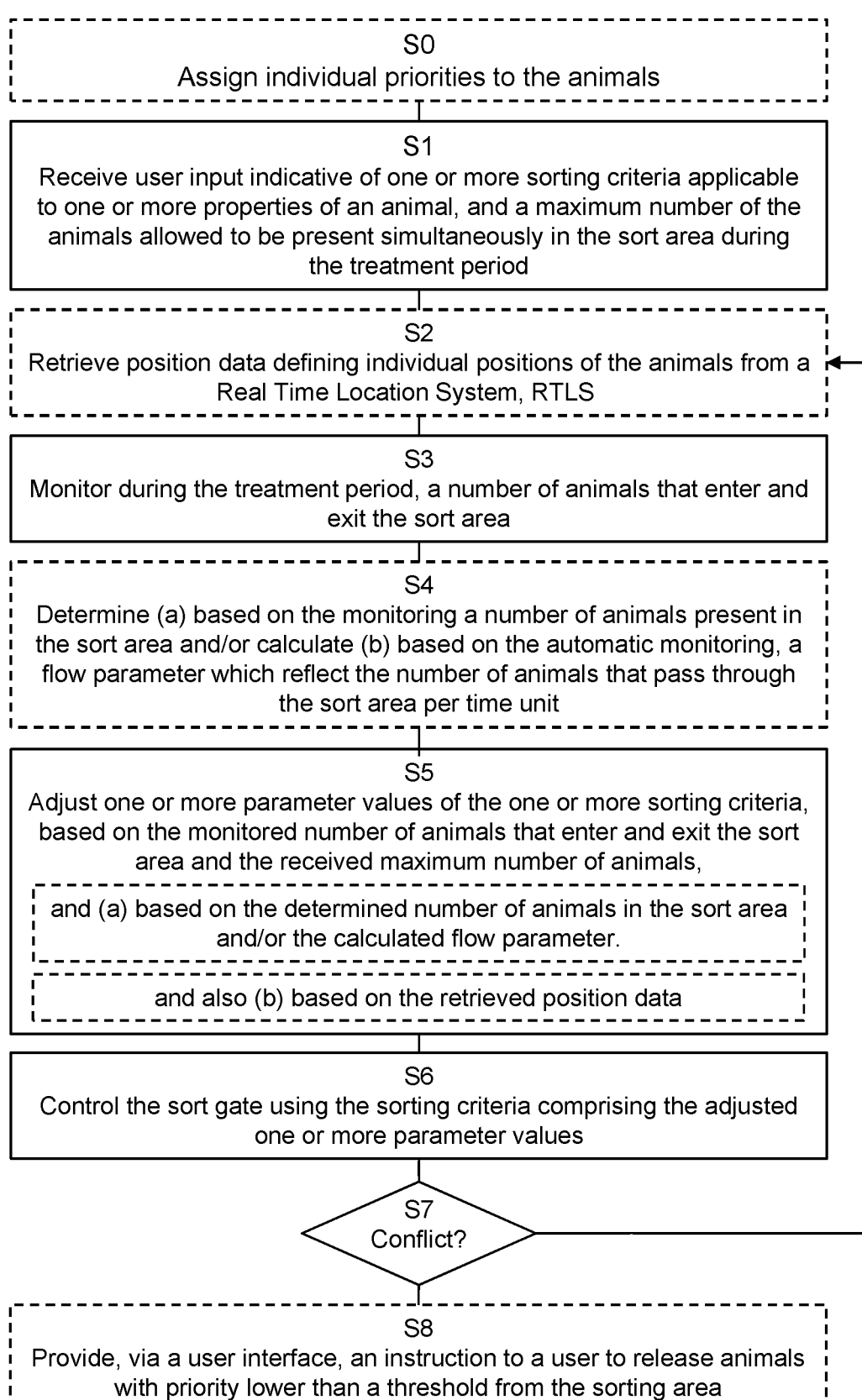
FIG. 5 is a flowchart of the method for operating an automatic sort gate according to the second aspect.

The control arrangement 100, or more specifically the processor 101 of the control arrangement 100, is configured to cause the control arrangement 100 to perform all aspects of the method described in FIG. 5. This is typically done by running computer program code stored in the memory 102 in the processor 101 of the control arrangement 100.

More specifically the control arrangement 100 is configured to perform all embodiments of the computer implemented method for operating an automatic sort gate 20 arranged to selectively sort animals arriving from a milking area 30 into a sorting area 40 for performing a treatment of the animals described herein. The method may be used for various treatments, such as hoof trimming, vaccination, health check, insemination. The method may also be applicable to other measures such as further sorting or regrouping in connection with treatment. In some embodiments, the treatment is at least partly manually performed. In some embodiments the treatment is completely manual.

The method may be implemented as a computer program comprising instructions which, when the program is executed by a computer, cause the computer to carry out the method. According to some embodiments the computer program is stored in a computer-readable medium that comprises instructions which, when executed by a computer (e.g. processor 101 of FIG. 4), cause the computer to carry out the method. In some embodiments the control arrangement 100 is located at the same premises as the livestock area 300. Alternatively, such control arrangement 10 may be remotely implemented e.g. in a computer cloud setup.

The computer implemented method will now be described in further detail with reference to the flow chart of FIG. 5 and the sorting system 200 of FIG. 4. FIG. 5 shows method steps of the proposed method for operating an automatic sort gate. Some method steps are optional, which is illustrated with dashed lines. The method is typically performed during a predetermined milking session (e.g. morning or evening) when a farmer wants to select a subset of a herd of animals to perform a treatment after the milking session.

Before starting a particular treatment, the sorting system 200 is typically configured for the particular treatment that is to be performed. The configuring in some embodiments involves specifying a duration of the treatment period, the size of the sorting area(s), and sorting criteria that shall be applied to select animals to direct into the sorting area 40 to receive the treatment. This is for example done by a user, such as the farmer. The configuration is for example done via a user interface 60, generated on a user device such as a computer or on a touch screen. The farmer may also be given a possibility to manually assign priority to individual animals 10. In other words, in some embodiments the method comprises assigning S0 individual priorities to one or more of the animals 10.

The user also inputs sorting criteria and information defining a maximum number of animals that are allowed to be inside a sorting/treatment space simultaneously during the treatment period. The treatment period is a time period when the staff that is scheduled for performing the treatment is available. The sorting criteria define animal conditions, here referred to as animal properties that an animal 10 should exhibit in order to be selected for receiving the treatment. Various animal properties may be considered by the sorting criteria. The animal properties may be registered historical data such as calving dates, insemination dates, hoof trimming dates, manual sorting flags, assigned animal properties etc. The animal properties may also be dynamic properties that are monitored such as animal position, animal activity, step length, step count, temperature, feeding data, milking data, and behavior data. For example, a sorting criteria could comprise that a cow is selected for a hoof trimming treatment if her last hoof trim date was 6 months ago. In other words, the computer implemented method comprises receiving S1, via a user interface 60, user input indicative of one or more sorting criteria applicable to one or more animal properties to determine whether an animal 10 should be allowed to enter the sorting area 40 to receive the treatment and receiving S1 a maximum number of the animals allowed to be present simultaneously in the sorting area 40 during a treatment period. In some embodiments the receiving S1 comprises presenting different predefined values or logic to the user on a user interface 60, whereafter the user may select (e.g. on a touch screen) desired values or sorting criteria. For example, some initial boundary conditions are entered at start-up of the sorting system. In other embodiments the user may alternatively or in addition enter any value or sorting criteria using for example a keyboard.

As mentioned above the initial sorting criteria will then be adjusted based on a number and/or flow of animals through the sorting area 40. One way to retrieve information indicative of such a flow is to use a Real Time Location System, RTLS, as the one described in FIG. 3. Hence, in some embodiments the method comprises retrieving S2 position data defining individual positions of the animals 10 from a RTLS. The information retrieved from the RTLS indicates that selected and/or treated cows have left the sorting area. This could of course alternatively be done based on manual feedback, but methods based on human interaction are vulnerable, which is why RTLS support, is typically very useful. The position data may also be indicative of other animal properties such as animal movement, animal pose, temperature etc.

The method further comprises monitoring S3 automatically a number of animals 10 that enter or exit the sorting area 40 during the treatment period. A common RFID system could also be used for this purpose. For example, an RFID reader is placed at one or more exits and entrances of the sorting area 40 to count how many animals exit and enter. More specifically, the RFID reader detects that a certain cow passes the RFID reader. Then a computer implemented counter can be used to keep track of how many animals have passed. The number of animals entering the system may alternatively be monitored by counting how many animals are selected to enter the sorting area 40. In other words, counting how many times the sort gate 20 is opened. As mentioned above, this monitoring S3 may alternatively be performed based on position data retrieved from the RTLS. The position data typically also indicate which animals have left the milking area 30 and are approaching the sort gate, which animals are on their way to the milking area, which animals 10 are currently in the milking area 30 and which animals are in the holding area 70. Given that the area has at least some basic RTLS coverage, the RTLS will find 100% of the cows, unlike a regular RFID system, which may have between 98% and 99.5% accuracy. The difference between 99.5% and 100% is not negligible in some contexts.

Based on the monitoring S3 a situation in the sorting area may be surveyed. This may be done in several different ways. For example, the number of animals 10 present in the sorting is determined, to find out if the occupancy in the sorting area is normal, too high or too low. The occupancy is e.g. the number of animals present divided by the maximum number of animals allowed in the sorting area 40. In other words, in some embodiments the method comprises continually determining S4$a$, based on the automatic monitoring, a number of animals present in the sorting area. Continually herein refers to performing an action repetitively, frequently or regularly.

Alternatively, the flow through the sorting area is monitored. The flow is typically expressed as a flow parameter defining for example a number of animals leaving the sorting area 40 per time unit. The flow is typically dependent on the type of treatment, the staff performing the treatment, and/or the animal behavior in the sorting area etc. Hence, the flow may vary over time and may not be known by the farmer when initiating the treatment session. In other words, in some embodiments the method comprises calculating S4$b$, based on the automatic monitoring, a flow parameter which reflect the number of animals that pass through the sorting area 40 per time unit.

The method then comprises adjusting S5, based on the monitoring S3 and the received maximum number of animals 10, one or more parameter values of the one or more sorting criteria. The parameter value(s) of the sorting criteria is typically adjusted to achieve a more even workload for the staff performing the treatment in the sorting area 40. More specifically an inflow of animals 10 to the sorting area 40 is controlled by adjusting S5 one or more parameter values of the entered sorting criteria. The operation of the sort gate is then controlled based on these adjusted sorting criteria. In other words, the method comprises controlling S6 the sort gate 20 using the sorting criteria comprising the adjusted one or more parameter values.

The one or more adjusted parameter values are in some embodiments one or more threshold values. For example, the animal property of an animal may be compared to a threshold value to determine whether the animal should be treated in the treatment period, or not. By raising these thresholds, the inflow to the sorting area 40 may be reduced. Stated differently, the sorting criteria may be made stricter by elevating these thresholds. In other words, in these embodiments the controlling S6 operation of the sort gate 20 comprises comparing the one or more animal properties to the at least one adjusted threshold values to determine whether a certain animal 10 should be selected to enter the sorting area 40. The method is typically repeated from step S2 during the treatment period and the monitoring and adjusting S5 is thus performed throughout the treatment period.

The adjusting S5 may be performed in different manners. For example, parameter values of the sorting criteria are adjusted S5$a$ based on the determined number of animals in the sorting area 40. Typically, thresholds of the sorting criteria are raised if the occupancy in the sorting area is high.

For example, when occupancy exceeds a certain thresholds, e.g. 50%, 75%, 90%, then one or more threshold values of the sorting criteria are increased. Typically, the thresholds are adjusted S5 before the sorting area is full (reaches the maximum number of animals), to avoid missing animals in high need of the treatment. In contrast, animals that can wait to the next occasion will be skipped if occupancy increases above a certain level. In other words, in some embodiments, the adjusting S5 comprises setting a higher threshold value upon determining S4a a first number of animals in the sorting area than upon determining S4a a second number of animals in the sorting area, wherein the first number of animals in the sorting area is higher than the second number of animals in the sorting area.

Another possibility is that the parameter values are in addition or alternatively adjusted S5a based on the calculated flow parameter. Typically, thresholds of the sorting criteria are raised if the flow through the sorting area is low. For example, if the current inflow to the sorting area 40 is higher than the outflow, then one or more thresholds of the sorting criteria are increased. In other words, in some embodiments, the adjusting S5 comprises setting a higher threshold value upon calculating S4b a first flow parameter value than upon calculating S4b a second flow parameter value, wherein the first flow parameter value is lower than the second flow parameter value.

Another possibility is to base the sorting criteria on priority. The priority may be a manually assigned S0 priority. Priority may also be automatically assigned based on how well an animal meet the sorting criteria. For example, an animal that exceeds thresholds of the sorting criteria significantly (i.e. with a certain amount) is regarded as highly prioritized.

One possibility is to let the sorting system define a maximum number of low prioritized animals allowed in the sorting area. In this way it is guaranteed that there is always room for some high prioritized animals. In other words, in some embodiments, the one or more parameter values define a maximum number of animals 10 having a priority lower than a certain threshold value that are allowed to enter or reside in the sorting area 40 at the same time or during a certain period of time.

In further embodiments the adjusting S5b the one or more parameter values is based on the position data retrieved from the RTLS. More specifically, sorting criteria may be adjusted based on where high prioritized animals are located. One possibility is to temporarily make the sorting criteria stricter when RTLS data indicate that many animals with high priority are expected to arrive at the sort gate within a certain time period. This might be the case if RTLS data indicate that several animals with high priority are positioned in the milking area 30 and are therefore expected to arrive at the sort gate 20 quite soon (e.g. within a certain time period, such as 5-10 minutes). Hence, in some embodiments, the one or more parameter values are adjusted S5b based on positions of prioritized animals 10 that have been assigned a priority above a certain threshold value.

Given that it is known how long the milking takes, it may even be possible to, based on position data, predict points in time when the prioritized animals will arrive at the sort gate and to adjust the sorting criteria to make sure that they can be taken care of. Hence, in some embodiments, the method comprises estimating, based on the position data, arrival times of the prioritized animals 10 at the sort gate 20, and adjusting S5 the one or more parameter values based on the estimated arrival times at the sort gate 20 of the prioritized animals 10.

In some situations adjusting S5 the sorting criteria may not be enough to resolve unexpected situations. For example, the staff performing the treatment may be interrupted or unexpected incidents and accidents may occur. In such situations a farmer needs to be alerted, such that appropriate measures may be taken. In other words, in some embodiments, the method comprises upon detecting S7 a potential sorting conflict, providing S8, via a user interface 60, an alarm or instruction to a user or staff to perform an action. For example, the action may be to release animals with priority lower than a threshold value from the sorting area.

Different sorting conflicts may trigger such an alarm. In some embodiments, the sorting conflict comprises that the number of animals 10 in the sorting area 40 is expected to reach the maximum number of animals 10 in the sorting area 40. In some embodiments, the sorting conflict comprises that the determined number of animals in the sorting area exceeds the maximum number. These situations may trigger an alarm to staff instructing them to release animals without treatment, or to only make a quick assessment of animals before releasing them without treatment, or to make an exception and treat an increased number of animals.

In some embodiments, the sorting conflict comprises that animals with a priority above a threshold value are expected to arrive at the sort gate within a certain time period. In other words, this may indicate that more prioritized animals than can be handled will arrive at the sort gate within a short time period. In such a scenario the staff or farmer might want to manually select which animals should be treated and let out some selected prioritized animals from the treatment area without treatment.

In some embodiments, the sorting conflict comprises that the calculated flow parameter indicates that an average flow of animals through the sorting area 40 has decreased more than a certain amount. For example, the number of animals that leaves the sorting area 40 per time unit suddenly drops more than a reference amount. This may be an indication that the work in the sorting area 40 is disturbed and that a manual inspection may be appropriate.

The terminology used in the description of the embodiments as illustrated in the accompanying drawings is not intended to be limiting of the described method, system, control arrangement or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR, unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A sorting system (200) for automatically selecting animals (10) to be treated during a desired treatment period comprising:

an automatic sort gate (20) arranged to selectively sort animals (10) arriving from a milking area (30) into a sorting area (40) for performing a treatment, a control arrangement (100) configured to:

i. receive, via a user interface (60), user input indicative of one or more sorting criteria applicable to one or more animal properties to determine whether an animal should be allowed to enter the sorting area to receive the treatment, receive user input on the desired treatment period, and receive user input on a maximum number of the animals allowed to be present simultaneously in the sorting area (40) during the desired treatment period, ii. monitor, continually during the desired treatment period, a number of animals (10) that enter and exit the sorting area (40), iii. adjust one or more parameter values of the one or more sorting criteria, based on the monitored number of animals that enter and exit the sorting area (40) during the desired treatment period, and the received user input on the maximum number of animals allowed to be present simultaneously in the sorting area during the desired treatment period, and iv. control the automatic sort gate (20) using the sorting criteria comprising the adjusted one or more parameter values.

2. The sorting system (200) according to claim 1, wherein the one or more animal properties comprise registered animal properties and/or monitored animal properties.

3. The sorting system (200) according to claim 1, wherein the one or more adjusted parameter values comprises at least one threshold value, and wherein the control arrangement (100) is configured to compare the one or more animal properties to the at least one threshold value to determine whether a certain one of the animals should be selected to enter the sorting area (40).

4. The sorting system (200) according to claim 1, wherein the control arrangement (100) is configured to, based on the continually monitored number of animals (10) that enter and exit the sorting area (40): continually determine a number of animals present in the sorting area (40) and/or calculate a flow parameter which reflect the number of animals that pass through the sorting area (40) per time unit, and to adjust the parameter values based on the determined number of animals present in the sorting area (40) and/or the calculated flow parameter.

5. The sorting system (200) according to claim 4, wherein the control arrangement (100) is configured to adjust the parameter value by setting a higher said threshold value upon calculating a first flow parameter value than upon calculating a second flow parameter value, wherein the first flow parameter value is lower than the second flow parameter value.

6. The sorting system (200) according to claim 4, wherein the control arrangement (100) is configured to adjust the parameter value by setting a higher said threshold value upon determining a first number of animals in the sorting area than upon determining a second number of animals in the sorting area, wherein the first number of animals in the sorting area is higher than the second number of animals in the sorting area.

7. The sorting system (200) according to claim 1, wherein the control arrangement (100) is configured to assign individual priorities to respective said animals (10) and wherein the one or more sorting criteria is applicable to the assigned individual priorities.

8. The sorting system (200) according to claim 7, wherein the one or more parameter values define a maximum number of the animals having a said priority lower than a certain threshold value that are allowed to enter or reside in the sorting area (40) at the same time or during a certain period of time.

9. The sorting system (200) according to claim 1, wherein the control arrangement (100) is configured to retrieve position data defining individual positions of the animals (10) from a Real Time Location System, RTLS, and adjust the one or more parameter values based on the position data.

10. The sorting system (200) according to claim 9, wherein the control arrangement (100) is configured to monitor a number of the animals that enter and exit the sorting area based on the position data.

11. The sorting system (200) according to claim 10, wherein the control arrangement (100) is configured to assign individual priorities to respective said animals (10), and the control arrangement is configured to adjust the one or more parameter values based on positions of prioritized animals (10) that have been assigned a said priority above a certain threshold value.

12. The sorting system (200) according to claim 11, wherein the control arrangement (100) is configured to provide an instruction to a user to perform an action upon detecting a potential sorting conflict.

13. The sorting system (200) according to claim 12, wherein the sorting conflict comprises at least one of:

the number of animals (10) in the sorting area (40) is expected to reach the maximum number of animals (10) in the sorting area (40), animals with a said priority above a threshold value are expected to arrive at the sort gate within a certain time period, the calculated flow parameter indicates that an average flow of animals through the sorting area (40) has decreased more than a certain amount, and the determined number of animals in the sorting area exceeds the maximum number of animals.

14. The sorting system (200) according to claim 10, wherein the control arrangement (100) is configured to estimate, based on the position data, arrival times of the prioritized animals (10) at the sort gate (20), and to adjust the one or more parameter values based on the estimated arrival times at the sort gate (20) of the prioritized animals (10).

15. The sorting system (200) according to claim 1, wherein the control arrangement (100) is configured to, based on the continually monitored number of animals (10) that enter and exit the sorting area (40), calculate a flow parameter which reflect the number of animals that pass through the sorting area (40) per time unit, and to adjust the parameter values based the calculated flow parameter.

16. A computer implemented method, for operating an automatic sort gate (20) arranged to selectively sort animals arriving from a milking area (30) into a sorting area (40) for performing a treatment of the animals, the computer implemented method comprising:

receiving (S1), via a user interface, user input indicative of one or more sorting criteria applicable to one or more animal properties to determine whether an animal should be allowed to enter the sorting area to receive the treatment during a desired treatment period, the user input including a maximum number of the animals allowed to be present simultaneously in the sorting area (40) during the desired treatment period, monitoring (S3) automatically a number of animals (10) that enter and exit the sorting area during the desired treatment period, adjusting (S5) one or more parameter values of the one or more sorting criteria, based on the monitoring (S3) of the number of animals that enter and exit the sorting area (40) during the desired treatment period, and on the received user input on the maximum number of animals (10) allowed to be present simultaneously in the sorting area during the desired treatment period, and controlling (S6) the sort gate (20) using the sorting criteria comprising the adjusted one or more parameter values.

17. The computer implemented method according to claim 16, wherein the animal properties comprise registered animal properties and monitored animal properties.

18. The computer implemented method according to claim 16, wherein the one or more adjusted parameter values comprises at least one threshold value, and wherein the controlling (S6) comprises comparing the one or more animal properties to the at least one threshold value to determine whether a certain one of the animals should be allowed to enter the sorting area (40).

19. The computer implemented method according to claim 16, further comprising: determining (S4a) continually a number of animals present in the sorting area based on the automatic monitoring and/or calculating (S4b), based on the automatic monitoring, a flow parameter which reflect the number of animals that pass through the sorting area (40) per time unit, and adjusting (S5a) the parameter values based on the determined number of animals in the sorting area (40) and/or the calculated flow parameter.

20. The computer implemented method according to claim 19, wherein the adjusting (S5) comprises setting a higher said threshold value upon calculating (S4b) a first flow parameter value than upon calculating (S4b) a second flow parameter value, wherein the first flow parameter value is lower than the second flow parameter value.

21. The computer implemented method according to claim 18, wherein the adjusting (S5) comprises setting a higher said threshold value upon determining (S4a) a first number of animals in the sorting area than upon determining (S4a) a second number of animals in the sorting area, wherein the first number of animals in the sorting area is higher than the second number of animals in the sorting area.

22. The computer implemented method according to claim 16, further comprising assigning (S0) individual priorities to respective said animals (10), and wherein the one or more sorting criteria is applicable to the assigned individual priorities.

23. The computer implemented method according to claim 22, wherein the one or more parameter values define a maximum number of the animals having a priority lower than a certain threshold value that are allowed to enter or reside in the sorting area (40) at the same time or during a certain period of time.

24. The computer implemented method according to claim 16, comprising retrieving (S2) position data defining individual positions of the animals (10) from a Real Time Location System, RTLS, and adjusting (S5b) the one or more parameter values based on the position data.

25. The computer implemented method according to claim 14, wherein the monitoring (S3) is performed based on the position data.

26. The computer implemented method according to claim 24, further comprising assigning (S0) individual priorities to respective said animals (10), and wherein the one or more sorting criteria is applicable to the assigned individual priorities, and adjusting (S5b) the one or more parameter values based on positions of prioritized animals (10) that have been assigned a priority above a certain threshold value.

27. The computer implemented method according to claim 26, comprising estimating, based on the position data, arrival times of the prioritized animals (10) at the sort gate (20), and adjusting (S5b) the one or more parameter values based on the estimated arrival times at the sort gate (20) of the prioritized animals (10).

28. The computer implemented method according to claim 16, further comprising:

upon detecting (S7) a potential sorting conflict, providing (S8) an instruction to a user to perform an action.

29. The computer implemented method according to claim 28 wherein the sorting conflict comprises at least one of:

the number of animals (10) in the sorting area (40) is expected to reach the maximum number of animals (10) in the sorting area (40), animals with a said priority above a threshold value are expected to arrive at the sort gate within a certain time period, the calculated flow parameter indicates that an average flow of animals through the sorting area (40) has decreased more than a certain amount, and the determined number of animals in the sorting area exceeds the maximum number of animals.

30. A control arrangement (100) configured to perform the computer implemented method according to claim 15.

31. The computer implemented method according to claim 16, further comprising: calculating (S4b), based on the automatic monitoring, a flow parameter that reflects the number of animals that pass through the sorting area (40) per time unit, and adjusting (S5a) the parameter values based on the calculated flow parameter.

\* \* \* \* \*